(12) United States Patent
Lisart et al.

(10) Patent No.: US 9,754,902 B2
(45) Date of Patent: Sep. 5, 2017

(54) BACKSIDE FIB PROBING DETECTOR IN A FORWARD AND REVERSE BODY BIASING ARCHITECTURE

(71) Applicant: STMicroelectronics (Rousset) SAS, Rousset (FR)

(72) Inventors: Mathieu Lisart, Aix en Provence (FR); Nicolas Borrel, Martigues (FR)

(73) Assignee: STMICROELECTRONICS (ROUSSET) (FR)

( * ) Notice: Subject to any disclaimer, the term of this patent is extended or adjusted under 35 U.S.C. 154(b) by 0 days.

(21) Appl. No.: 15/072,209

(22) Filed: Mar. 16, 2016

(65) Prior Publication Data

US 2017/0092600 A1    Mar. 30, 2017

(30) Foreign Application Priority Data

Sep. 30, 2015   (FR) ..................... 15 59292

(51) Int. Cl.
| | | |
|---|---|---|
| H01L 23/58 | (2006.01) | |
| H01L 23/00 | (2006.01) | |
| H03K 17/687 | (2006.01) | |
| H01L 21/66 | (2006.01) | |
| H01L 23/64 | (2006.01) | |

(52) U.S. Cl.
CPC ............ *H01L 23/576* (2013.01); *H01L 22/34* (2013.01); *H01L 23/647* (2013.01); *H03K 17/687* (2013.01)

(58) Field of Classification Search
CPC ....... H01L 22/30; H01L 22/34; H01L 23/576; H01L 23/647; H01L 27/0629; H03K 17/687
See application file for complete search history.

(56) References Cited

U.S. PATENT DOCUMENTS

| | | | | |
|---|---|---|---|---|
| 8,461,919 | B2* | 6/2013 | Kim | ............. H03K 17/94 327/564 |
| 2012/0025862 | A1* | 2/2012 | Chumakov | ............. H01L 22/12 324/762.01 |
| 2013/0032863 | A1* | 2/2013 | Kawahara | ............. H01L 28/20 257/272 |
| 2013/0193437 | A1 | 8/2013 | Lisart et al. | |
| 2014/0138686 | A1 | 5/2014 | Wuidart et al. | |
| 2014/0247001 | A1* | 9/2014 | Moriya | ............. H01L 27/092 318/400.29 |
| 2015/0194393 | A1 | 7/2015 | Lisart et al. | |
| 2015/0214163 | A1 | 7/2015 | Kuenemund et al. | |

FOREIGN PATENT DOCUMENTS

| | | | |
|---|---|---|---|
| FR | 2986356 | A1 | 8/2013 |
| FR | 2998419 | A1 | 5/2014 |

* cited by examiner

*Primary Examiner* — Stephen W Smoot
(74) *Attorney, Agent, or Firm* — Slater Matsil, LLP (57) ABSTRACT

An integrated circuit including a plurality of first semiconductor strips of a first conductivity type and of second semiconductor strips of a second conductivity type arranged in alternated and contiguous fashion on a region of the second conductivity type, including for each of the first strips: a plurality of bias contacts; for each bias contact, a switch capable of applying a potential on the bias contact; two detection contacts arranged at the ends of the first strip; and a detection circuit having its activation causing the turning off of the switches and the comparison with a threshold of the resistance between the detection contacts.

22 Claims, 8 Drawing Sheets

BACKSIDE FIB PROBING DETECTOR IN A FORWARD AND REVERSE BODY BIASING ARCHITECTURE

This application claims priority to French Patent Application No. 1559292, filed on Sep. 30, 2015, which application is hereby incorporated herein by reference.

TECHNICAL FIELD

The present disclosure relates to integrated electronic circuits, more particularly to an integrated circuit protected against attacks carried out from the rear surface of the circuit.

BACKGROUND

Integrated circuits sometimes undergo attacks from pirates aiming at determining the structure of the circuit, at modifying the operation thereof, or at extracting confidential data therefrom. An attack may be carried out from the rear surface of a circuit provided at its front surface with conductive tracks and with components such as capacitors, diodes, or transistors. During the attack, a portion of the rear surface is first etched. From this etched portion, cavities having a width of a few microns are for example formed by an ion beam and extend towards the upper surface all the way to the components or to the conductive tracks. Electric contacts with the components or the tracks are then created in the cavities, and pirates use these contacts to analyze the circuit in operation.

It is desirable to have integrated circuits protected against this type of attack, known devices having various disadvantages and implementation issues.

SUMMARY

Thus, an embodiment provides an integrated circuit comprising a plurality of first semiconductor strips of a first conductivity type and of second semiconductor strips of a second conductivity type arranged in alternated and contiguous fashion on a region of the second conductivity type. Each of the first strips comprises a plurality of bias contacts. For each bias contact, there is a switch capable of applying a potential on the bias contact. Two detection contacts are arranged at the ends of said first strip. A detection circuit has its activation causing the turning off of the switches and the comparison with a threshold of the resistance between the detection contacts.

According to an embodiment, the threshold is the normal resistance of a first strip between the detection contacts.

According to an embodiment, each detection circuit applies the bias potential on one of the detection contacts of the first associated strip.

According to an embodiment, a detection circuit is common to two first strips, the threshold associated with a first strip being the resistance between the detection contacts of the other first strip.

According to an embodiment, for each first strip, the switches are MOS transistors formed inside of and on a first strip next to said first strip.

According to an embodiment, the detection circuit associated with a first strip comprises MOS-type transistors formed inside of and on a first strip next to said first strip.

According to an embodiment, each detection circuit is capable of applying a voltage in the range from 300 to 500 mV between the detection contacts of the first associated strip.

2

According to an embodiment, the width of the first strips and of the second strips is smaller than 2.5 µm and their length is greater than 100 µm.

According to an embodiment, the detection circuits are successively activated, a single detection circuit being activated at a time.

BRIEF DESCRIPTION OF THE DRAWINGS

The foregoing and other features and advantages will be discussed in detail in the following non-limiting description of specific embodiments in connection with the accompanying drawings.

DETAILED DESCRIPTION OF ILLUSTRATIVE EMBODIMENTS

The same elements have been designated with the same reference numerals in the different drawings and, further, the various drawings are not to scale. For clarity, only those steps and elements which are useful to the understanding of the described embodiments have been shown and are detailed.

In the following description, when reference is made to terms qualifying the relative position, such as terms "upper", "lower", etc., reference is made to the orientation of the concerned elements in FIGS. 1B, 2A, and 7.

In the present description, term "connected" designates a direct electric connected between two elements, while term "coupled" designates an electric connection between two elements which may be direct or via one or a plurality of other passive or active components, such as resistors, capacitors, inductances, diodes, transistors, etc.

Figure 1A:
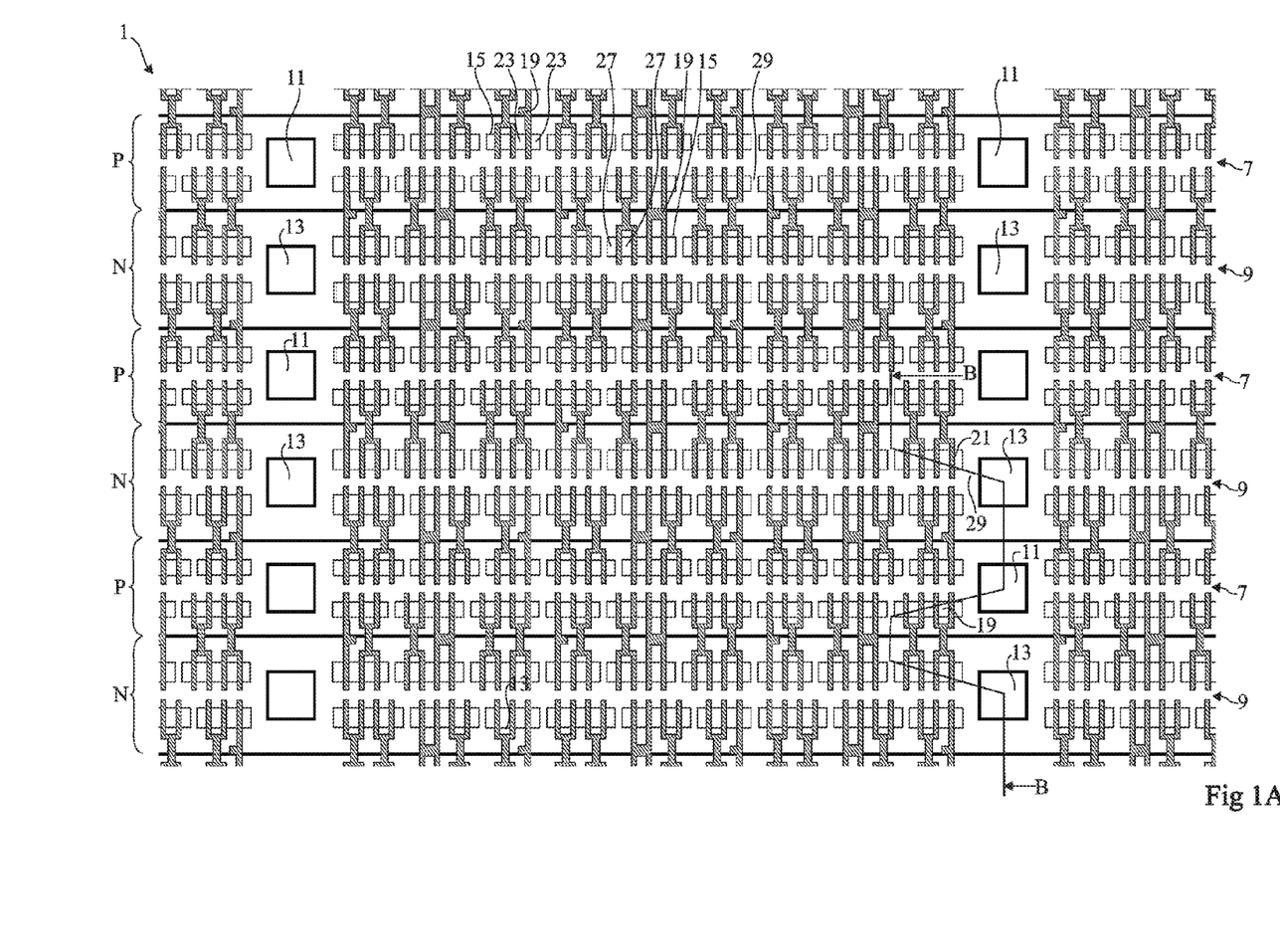
FIG. 1A is a partial simplified top view of an example of an integrated circuit.

FIG. 1A is a partial simplified top view of an example of an integrated circuit 1. FIG. 1B is a simplified cross-section view of integrated circuit 1 along a broken line B-B shown in FIG. 1A.

Integrated circuit 1 comprises a semiconductor substrate (or support) 3, for example, a P-type doped silicon wafer. An N-type doped region 5, for example, a buried layer, covers a portion of the surface of substrate 3. P-type doped wells 7 and N-type doped wells 9 arranged in contiguous alternated strips extend on region 5.

Bias contacts 11 are formed at regular intervals in the upper portion of each well, or strip, 7 and bias contacts 13 are similarly formed in the upper portion of each well, or strip, 9. In the shown example, contacts 11 and 13 in top view are arranged at the intersections between lines orthogonal to the direction of strips 7 and 9 and the center lines of the strips. Each of contacts 11 and 13 corresponds to a doped area of the same type as the associated strip, with a higher doping level.

Many MOS-type transistors are formed inside of and on the upper portion of each of strips 7 and 9 between respective contacts 11 or 13. These transistors are gathered by three or four in active areas 15. Each transistor comprises a gate 19 which may be common to a plurality of transistors, arranged between drain and source areas 23 for the P-channel transistors and 27 for the N-channel transistors. Insulating trenches 29 extend from portions of the upper surface of the strips to delimit the active areas.

In top view, broken line B-B successively crosses an N-type doped strip 9, a P-type doped strip 7, and another N-type doped strip 9, and crosses in each of these strips an active area and a bias contact.

Figure 1B:
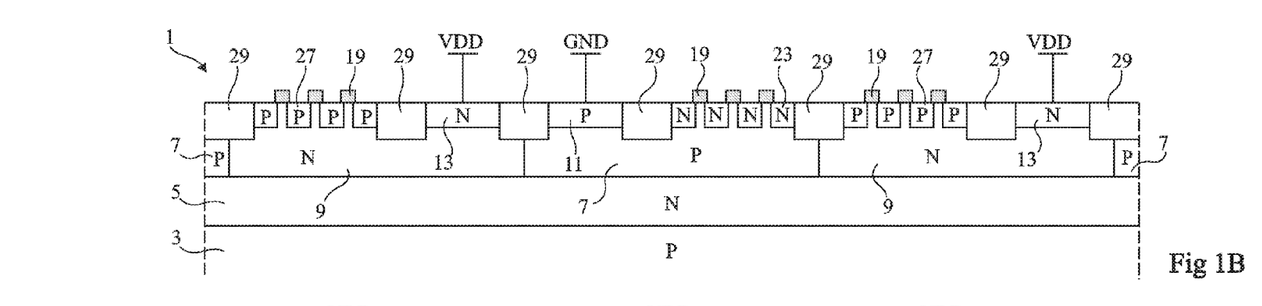
FIG. 1B is a partial simplified cross-section view of the integrated circuit shown in FIG. 1A.

As illustrated in FIG. 1B, a reference voltage, for example, a ground GND, is applied to each bias contact 11, and a voltage VDD higher than the ground voltage is applied to each bias contact 13. Thereby, each P-type doped strip 7 is biased to voltage GND, and each N-type doped strip 9 is biased to voltage VDD.

Figure 1C:
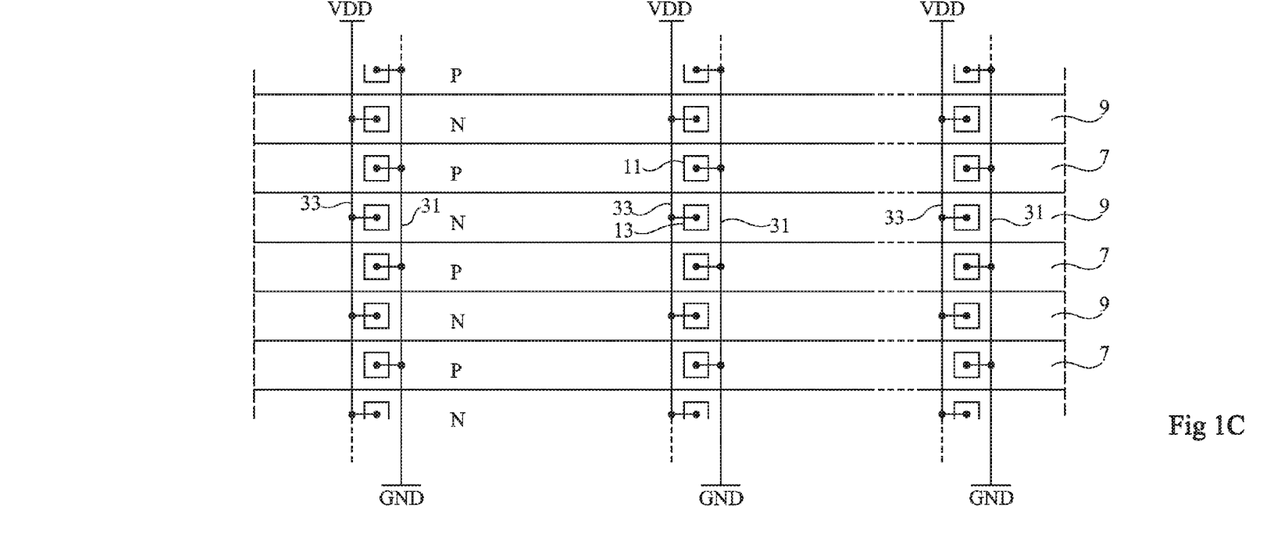
FIG. 1C shows the top view of FIG. 1A, simplified and at a different scale.

FIG. 1C shows the top view of FIG. 1A, simplified and at a different scale. The transistors are not shown. Strips 7 and 9 provided with bias contacts 11 and 13 are visible, as well as connection 31 between contacts 11 and the ground and connections 33 apply potential VDD to contacts 13.

The length of each strip is for example in the range from 100 μm to 1 mm. The width of each strip is for example smaller than 2.5 μm. In each strip 7 or 9, the number of bias contacts 11, or the number of bias contacts 13, may be in the range from 5 to 100. The number of strips 7, or the number of strips 9, is for example in the range from 20 to 200.

Figure 2A:
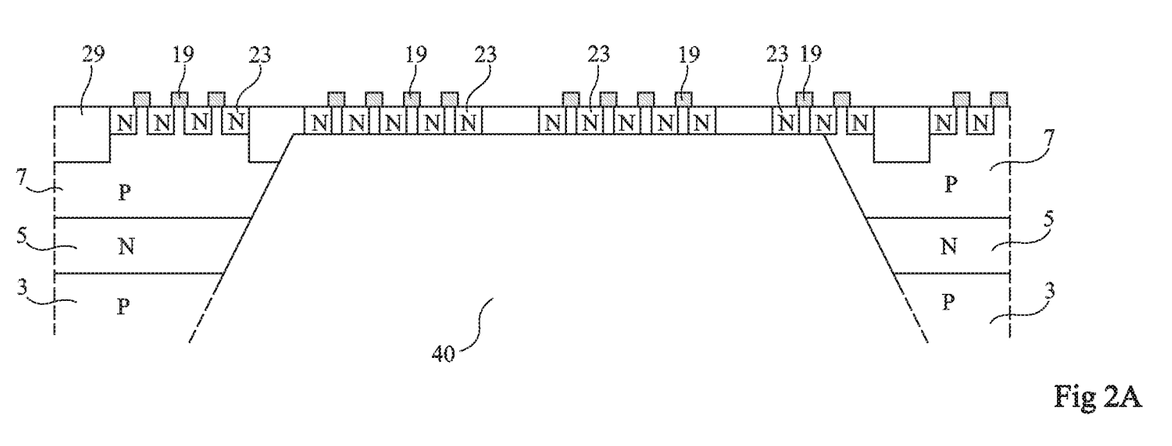
FIGS. 2A and 2B illustrate an attack of the circuit shown in FIG. 1A.
Figure 2B:
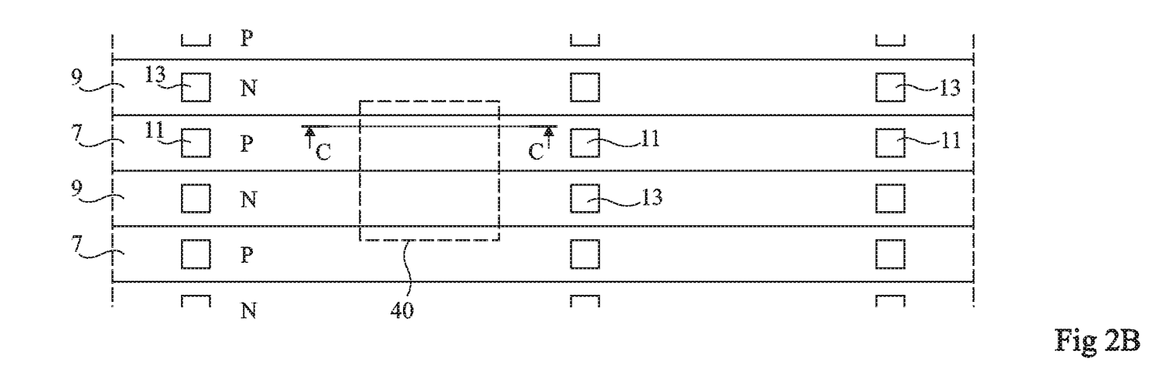

FIGS. 2A and 2B show previously-described integrated circuit 1, while a pirate has pierced a cavity having the width of at least two strips from the rear surface to prepare an attack. FIG. 2A is a partial cross-section along a segment C-C shown in FIG. 2B. FIG. 2B is a top view corresponding to FIG. 1C.

In FIGS. 2A and 2B, a cavity 40 has been dug by a pirate from the rear surface through substrate 3, region 5, and the width of a P-type strip 7. The cavity for example extends all the way to the lower level of drain and source areas 23. The lower portion of P-type strip 7 free of insulating trenches and of drain and sources areas is interrupted by cavity 40.

It is here desired to detect the presence of such cavities, to prevent a pirate from obtaining information via contacts created in these cavities.

Figure 3A:
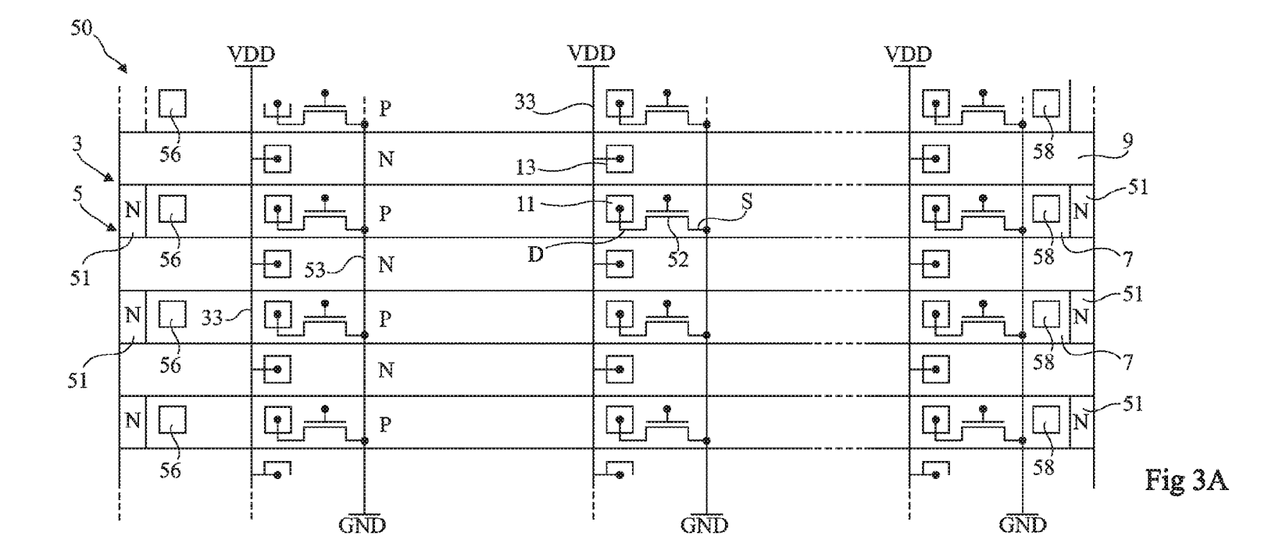
FIG. 3A is a partial simplified top view of an embodiment of an integrated circuit protected against attacks.

FIG. 3A is a partial simplified top view of an embodiment of an integrated circuit 50 protected against attacks. Integrated circuit 50 comprises elements having roles identical to those of integrated circuit 1 of FIGS. 1A to 1C, designated with the same reference numerals. Thus, integrated circuit 50 comprises a P-type doped semiconductor substrate 3; an N-type doped region 5 which extends on substrate 3, for example, a buried layer; and P-type doped wells 7 and N-type doped wells 9 arranged in alternated strips on region 5 and provided with respective bias contacts 11 and 13. Connections 33 apply potential VDD to bias contacts 13.

Transistors, not shown, are formed inside and on top of strips 7 and 9. It should be noted that at each end of each strip 7, N-type regions 51, in contact with region 5 and with N strips 9, insulate each P strip 7 from the other strips 7 and from substrate 3.

Integrated circuit 50 further comprises an N-channel MOS transistor 52 for each contact 11, contacts 56, 58 at the ends of each strip 7, and detection circuits.

Figure 3B:
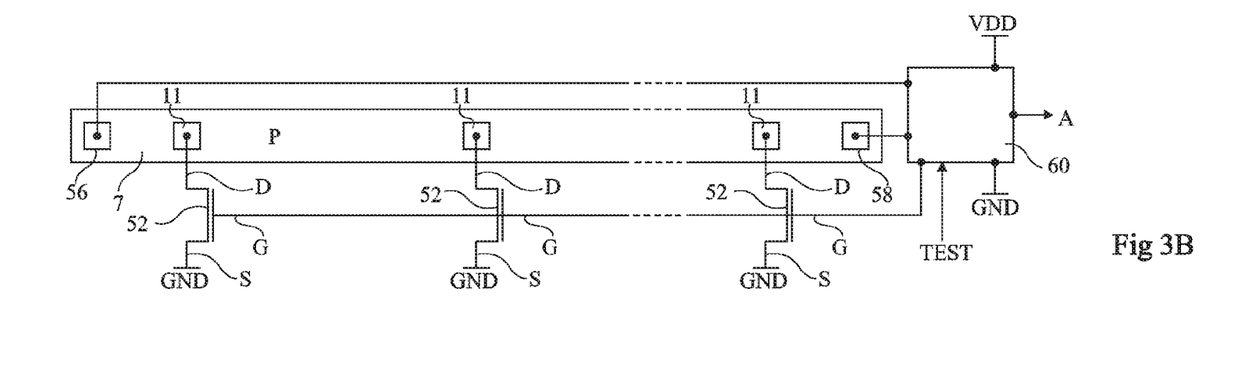
FIG. 3B shows a strip of the integrated circuit illustrated in FIG. 3A connected to a detection circuit.

FIG. 3B shows, in top view, a strip 7 connected to a detection circuit 60. Strip 7 is schematically shown in top view, provided with contacts 11, 56, and 58.

Each bias contact 11 is coupled to drain D of a transistor 52. Sources S of transistors 52 are coupled to ground GND. The gates of transistors 52 associated with a same strip 7 are interconnected. Detection circuit 60 is coupled to the gates and controls all the switches of a same strip 7, and thus controls the application of bias voltage GND to the entire strip 7.

Contacts 56 and 58 are contacts intended for the detection of the possible presence of pirate cavities. Detection contacts 56 and 58 are coupled to detection circuit 60. Detection circuit 60 is supplied between potentials VDD and ground GND.

Each detection circuit 60 is capable of receiving a test signal TEST and of generating an alert signal A. In operation, test phases are provided, during which signals TEST are successively activated by a circuit, not shown, a single signal being activated at a time. When the test signal of a detection circuit is activated, the detection circuit turns off transistors 52, and bias voltage GND is no longer applied to the associated strip 7. Detection circuit 60 then compares the electric resistance between contacts 56 and 58 with a threshold, and activates the alert signal if this electric resistance is greater than the threshold. The threshold may correspond to the maximum resistance that strip 7 normally has between contacts 56 and 58 in the absence of a pirate cavity.

When a cavity has been dug by a pirate and totally or partially interrupts a P-type doped strip 7, the electric resistance between contacts 56 and 58 of this strip strongly increases. The associated detection circuit then generates an alert signal enabling to detect this attack attempt and to take countermeasures such as stopping the integrated circuit or destroying confidential data present on the circuit.

Figure 4:
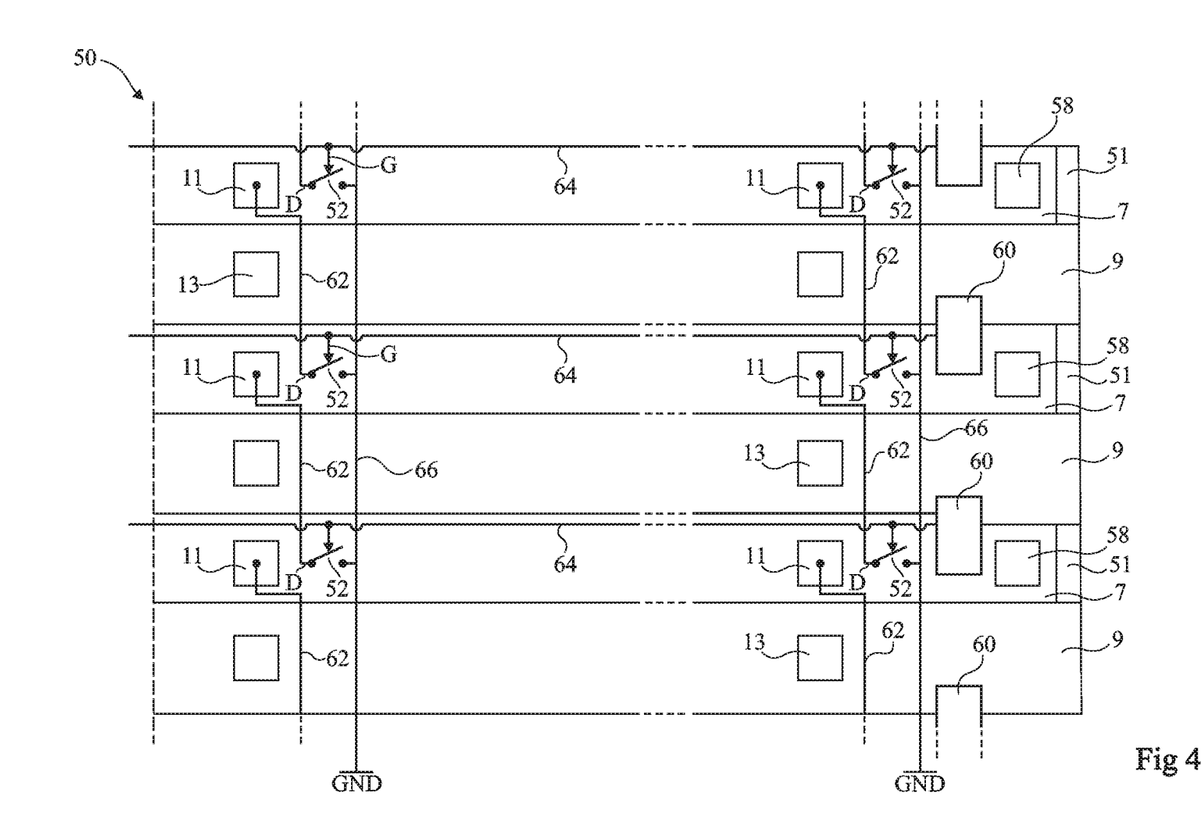
FIG. 4 shows the top view of FIG. 3A at a different scale.

FIG. 4 shows the top view of FIG. 3A, at a different scale, and details an embodiment of transistors 52 of integrated circuit 50 described in relation with FIGS. 3A and 3B. Strips 7 and 9 are shown in FIG. 4, as well as bias contacts 11 and 13. Each transistor 52 is shown in the form of a switch. For each strip 7, connections 62 connect each contact 11 with the associated drain D, and a connection 64 connects gates G together and to detection circuit 60. Connections 66 connect the sources of transistors 52 to ground GND.

As illustrated in FIG. 4, for each strip 7, the associated transistors 52 are formed inside of and on another neighboring strip 7.

For each strip 7, detection circuit 60 is formed inside of and on this other neighboring strip 7 and a neighboring strip 9.

Thus, during the test of a strip 7, the associated transistors 52 are located in a properly biased strip. This enables to ensure the proper operation of transistors 52. Similarly, MOS transistors comprised in detection circuit 60 are inside of and on a properly-biased strip.

As a variation, each of the transistors 52 associated with a strip 7 may be located in any other strip 7, the important point being for the two strips 7 not to be tested at the same time. Similarly, the MOS transistors of detection circuit 60 associated with a strip 7 may be located in any portion of the integrated circuit remaining properly biased during the test, to ensure the proper operation of the detection circuit.

Figure 5:
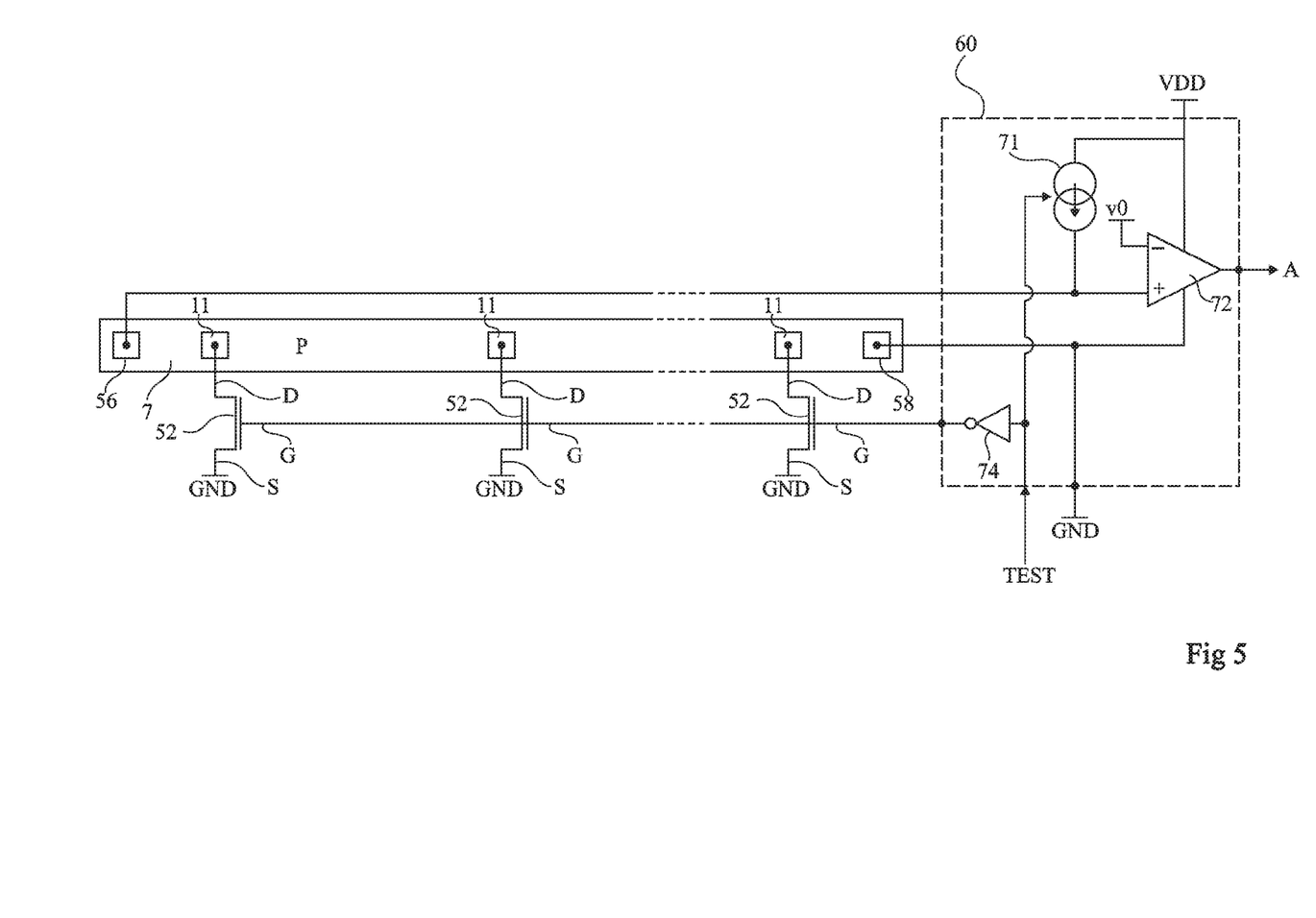
FIG. 5 shows the simplified view of FIG. 3B and details an example of a detection circuit.

FIG. 5 shows the simplified view of FIG. 3B and details an example of detection circuit 60. Detection circuit 60 comprises a current source 71, a comparator 72 supplied with the voltage between potential VDD and ground GND, and an inverter 74 receiving signal TEST. The detection contact 58 of strip 7 is connected to ground GND. Comparator 72 compares the potential on detection contact 56 with a potential V0.

When signal TEST is deactivated, inverter 74 maintains transistors 52 in the on state and alert signal A is deactivated. When signal TEST is activated, transistors 52 are in the off state. Current source 71 then injects a current into detection contact 56, and the potential on the positive input of comparator 72 is proportional to the resistance of strip 7 between contacts 56 and 58. When strip 7 is partially or totally interrupted by a pirate cavity, this resistance is abnormally high and alert signal A is activated. As an example, voltage V0 is in the range from 300 to 500 mV.

Figure 6:
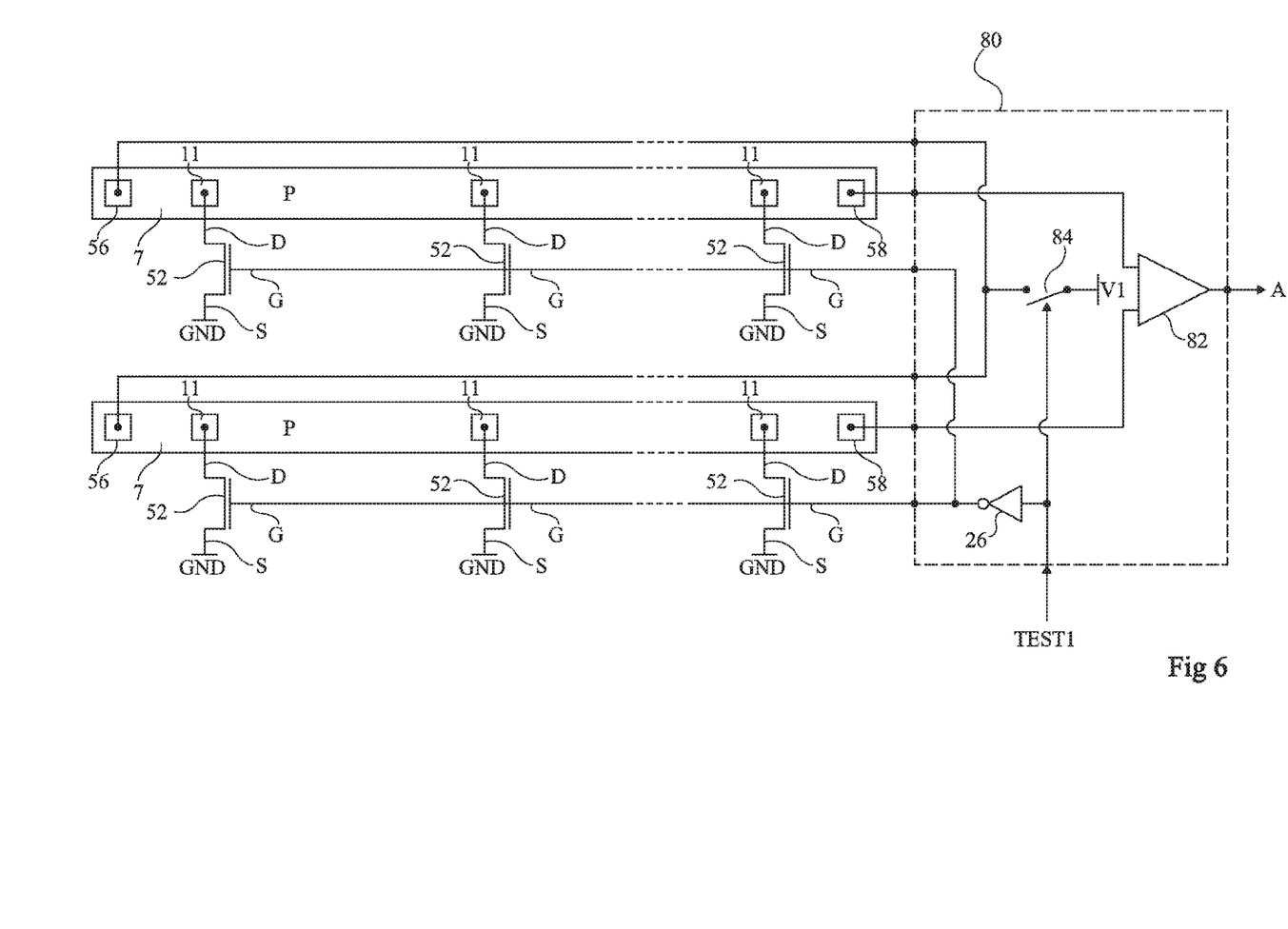
FIG. 6 shows two strips of the integrated circuit illustrated in FIG. 3A connected to another embodiment of the detection circuit.

FIG. 6 shows two of strips 7 of integrated circuit 50 previously illustrated in FIGS. 3A and 3B, connected to a detection circuit 80 replacing two detection circuits 60. It should be understood that such P-type strips 7 are separated by strips 7 and 9, not shown.

For each of the two strips 7, gates G of the associated transistors 52 are coupled together to detection circuit 80, and detection contacts 56 and 58 are coupled to circuit 80. Circuit 80 is capable of receiving a test signal TEST1 and of generating an alert signal A. Detection circuit 80 comprises a comparison circuit 82, a switch, and an inverter 86.

When signal TEST1 is activated, inverter 86 turns off the transistors 52 associated with the two strips 7 and switch 84 applies a positive voltage V1 to detection contacts 56 of the two strips 7. Detection circuit 80 then compares the potentials of detection contacts 58. If a pirate cavity damages one or the other of the two strips 7, detection circuit 80 generates an alert signal when the resistances between detection contacts 56 and 58 of the two strips 7 differ for example by more than 10%. As an example, voltage V1 is in the range from 300 to 500 mV.

Figure 7:
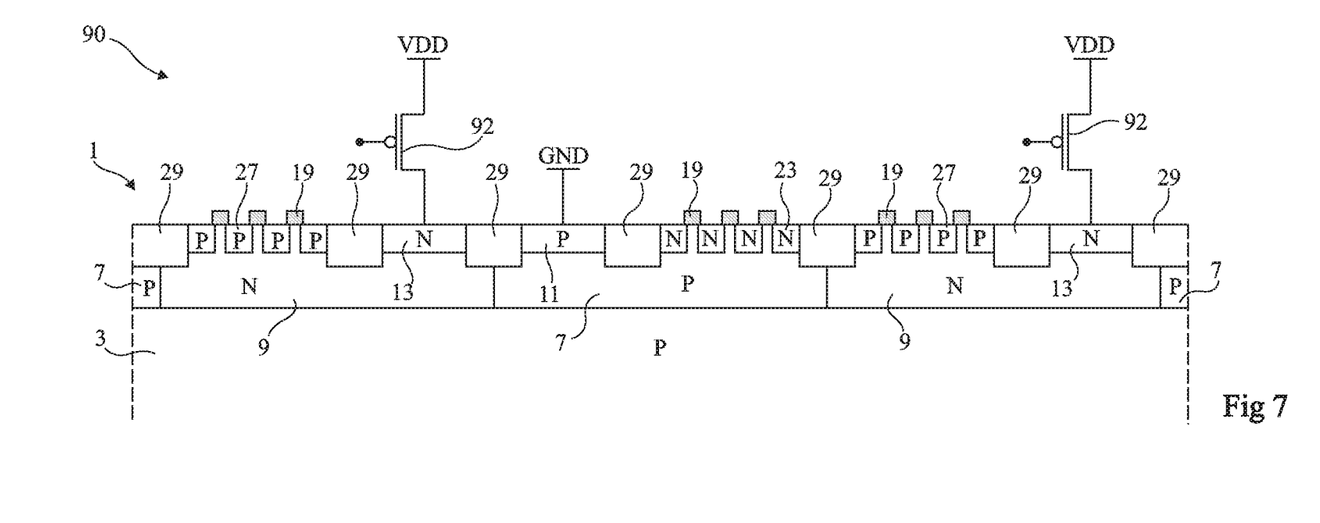
FIG. 7 is a partial simplified cross-section view of another type of integrated circuit capable of being protected against attacks.

FIG. 7 is a cross-section view of another type of integrated circuit capable of being protected against attacks. Integrated circuit 90 comprises the same elements as integrated circuit 50, except for buried layer 5. Each of the N strips 9 is insulated from the other strips 9 by substrate 3 and P strips 7.

Bias contacts 11 of P strips 7 are grounded. For each of bias contacts 13 of N strips 9, potential VDD is applied to the source of a P-channel MOS transistor 92 having its drain coupled to contact 13. The transistors 92 associated with a strip 9 may be formed inside of an on another strip 9.

The gates of all the transistors 92 of each of strips 9 may be coupled to a detection circuit capable of turning off transistors 92 and of activating an alarm according to the resistance between two detection contacts arranged at the ends of strip 9.

In the previously-described embodiments, the surface of the integrated circuit dedicated to the detection of pirate cavities is limited to one transistor for each of the many bias contacts and to one detection circuit per strip. The detection circuits are simple and there may be up to 100 bias contacts for each strip. Thus, the total surface area dedicated to the protection may advantageously amount to less than 1% of the integrated circuit surface area.

Specific embodiments have been described. Various alterations, modifications, and improvements will occur to those skilled in the art. In particular, although the described integrated circuits are formed from a silicon substrate, other semiconductor substrate s may be used.

Further, although, in the described embodiments, the substrate is made of P-type doped semiconductor, the substrate may also be made of an N-type doped semiconductor, the doping types of the other portions of the integrated circuit then being exchanged and potential VDD then being smaller than potential GND.

Although, in the described embodiments, bias potential GND or VDD is applied to the bias contacts by MOS-type transistors, other types of switches may be used, for example, bipolar transistors.

Various embodiments with different variations have been described hereabove. It should be noted that those skilled in the art may combine various elements of these various embodiments without showing any inventive step. In particular, it is possible to form an integrated circuit combining strips 7 equipped with detection circuits 60 and other strips 7 equipped with detection circuits 80.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An integrated circuit comprising a plurality of first semiconductor strips of a first conductivity type and a plurality of second semiconductor strips of a second conductivity type arranged in alternated and contiguous fashion on a region of the second conductivity type, comprising for each of the first semiconductor strips:
   a plurality of bias contacts;
   a plurality of switches, wherein each switch is associated with a respective bias contact, each switch capable of applying a potential on the respective bias contact;
   two detection contacts arranged at ends of the first semiconductor strip; and
   a detection circuit configured to control the switches and to compare a resistance between the detection contacts with a reference threshold.

2. The integrated circuit of claim 1, wherein the reference threshold is a normal resistance of a first semiconductor strip between the detection contacts.

3. The integrated circuit of claim 1, wherein each detection circuit is configured to apply a bias potential to one of the detection contacts of the associated first semiconductor strip.

4. The integrated circuit of claim 1, wherein a detection circuit is common to two first semiconductor strips, the reference threshold associated with a first semiconductor strip being the resistance between the detection contacts of the other first semiconductor strip.

5. The integrated circuit of claim 1, wherein, for each first semiconductor strip, the switches are MOS transistors formed inside of and on a first semiconductor strip next to the first semiconductor strip.

6. The integrated circuit of claim 1, wherein the detection circuit associated with a first semiconductor strip comprises MOS-type transistors formed inside of and on a first semiconductor strip next to the first semiconductor strip.

7. The integrated circuit of claim 1, wherein each detection circuit is capable of applying a voltage between 300 and 500 mV between the detection contacts of the associated first semiconductor strip.

8. The integrated circuit of claim 1, wherein a width of the first semiconductor strips and of the second semiconductor strips is smaller than 2.5 µm and a length of the first semiconductor strips and of the second semiconductor strips is greater than 100 µm.

9. The integrated circuit of claim 1, wherein the integrated circuit has a total surface area, the first and second semiconductor strips, the switches and the detection circuits taking up less than 1% of the total surface area.

10. The integrated circuit of claim 1, wherein the detection circuits are successively activated, a single detection circuit being activated at a time.

11. An integrated circuit comprising:
a semiconductor substrate having a first conductivity type;
a semiconductor layer overlying the semiconductor substrate and having a second conductivity type opposite the first conductivity type;
a semiconductor region overlying the semiconductor layer, the semiconductor region including a plurality of n-doped strips interdigitated with a plurality of p-doped strips;
a plurality of bias contacts disposed within the semiconductor region;
a plurality of switches, wherein each switch is associated with a respective bias contact, each switch capable of applying a potential on the respective bias contact;
a plurality of detection contacts arranged at ends of strips that include bias contacts; and
a plurality of detection circuits, each detection circuit configured to control at least one associated switch and to compare a resistance between the detection contacts of the associated strip with a reference threshold.

12. The integrated circuit of claim 11, wherein VDD bias contacts are disposed within the n-doped strips and wherein ground bias contacts are disposed within the p-doped strips.

13. The integrated circuit of claim 12, wherein the first conductivity type is p-type and the second conductivity type is n-type.

14. The integrated circuit of claim 11, wherein the switches comprise MOS transistors.

15. The integrated circuit of claim 11, wherein each detection circuit is configured to apply a voltage in between 300 and 500 mV between the detection contacts of the associated strip.

16. The integrated circuit of claim 11, wherein each strip has a width that is smaller than 2.5 µm and a length that is greater than 100 µm.

17. The integrated circuit of claim 11, wherein the detection circuits are successively activated, a single detection circuit being activated at a time.

18. An integrated circuit, comprising:
a plurality of first semiconductor strips of a first conductivity type;
a plurality of second semiconductor strips of a second conductivity type interdigitated with the plurality of first semiconductor strips, wherein each of the first semiconductor strips comprises:
a first detection contact at a first end of the first semiconductor strip;
a second detection contact at a second end of the first semiconductor strip;
a bias contact disposed between the first detection contact and the second detection contact along a length-wise direction of the first semiconductor strip; and
a switch coupled between the bias contact and a bias potential; and
a detection circuit configured to determine a resistance of the first semiconductor strip between the first detection contact and the second detection contact based on a test signal.

19. The integrated circuit of claim 18, the detection circuit being further configured to compare the resistance against a reference threshold.

20. The integrated circuit of claim 18, the switch being configured to decouple the bias contact from the bias potential when the detection circuit determines the resistance.

21. The integrated circuit of claim 18, wherein the test signal comprises a voltage between 300 and 500 mV.

22. The integrated circuit of claim 18, wherein the bias potential comprises a ground potential.

* * * * *